US009489206B2

(12) United States Patent
Spadini et al.

(10) Patent No.: US 9,489,206 B2
(45) Date of Patent: Nov. 8, 2016

(54) DEPENDENT INSTRUCTION SUPPRESSION

(71) Applicant: Advanced Micro Devices, Inc., Sunnyvale, CA (US)

(72) Inventors: Francesco Spadini, Austin, TX (US); Michael Achenbach, Austin, TX (US); Emil Talpes, San Mateo, CA (US); Ganesh Venkataramanan, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 533 days.

(21) Appl. No.: 13/943,264

(22) Filed: Jul. 16, 2013

(65) Prior Publication Data
US 2015/0026685 A1    Jan. 22, 2015

(51) Int. Cl.
G06F 9/00    (2006.01)
G06F 9/38    (2006.01)

(52) U.S. Cl.
CPC .......... G06F 9/3836 (2013.01); G06F 9/3861 (2013.01)

(58) Field of Classification Search
CPC .......................... G06F 9/3836; G06F 9/3861
See application file for complete search history.

(56) References Cited

U.S. PATENT DOCUMENTS

| 6,249,862 | B1 | 6/2001 | Chinnakonda et al. |
| 6,735,688 | B1 | 5/2004 | Upton |
| 6,981,129 | B1 | 12/2005 | Boggs |
| 2003/0126406 | A1 | 7/2003 | Hammarlund |
| 2008/0028193 | A1* | 1/2008 | Dhodapkar ........... G06F 9/3824 712/219 |
| 2014/0025933 | A1 | 1/2014 | Venkataramanan |
| 2014/0181476 | A1 | 6/2014 | Srinivasan et al. |

OTHER PUBLICATIONS

U.S. Appl. No. 13/926,184, filed Jun. 25, 2013, entitled "Dependence-Based Replay Suppression".
U.S. Appl. No. 13/926,193, filed Jun. 25, 2013, entitled "Dependent Instruction Suppression".
U.S. Appl. No. 13/943,310, filed Jul. 16, 2013, entitled "Dependent Instruction Suppression in a Load-Operation Instruction".
Non-Final Office Action mailed Nov. 24, 2015 in U.S. Appl. No. 13/926,184, 14 pages.
Non-Final Office Action mailed Nov. 24, 2015 in U.S. Appl. No. 13/926,193, 16 pages.
Non-Final Office Action mailed Feb. 1, 2016 in U.S. Appl. No. 13/943,310, 30 pages.
Final Office Action mailed Mar. 17, 2016 in U.S. Appl. No. 13/926,185, 20 pages.
Final Office Action mailed Mar. 15, 2016 in U.S. Appl. No. 13/926,193, 22 pages.

* cited by examiner

Primary Examiner — Zachary K Huson

(57) ABSTRACT

A method includes suppressing execution of at least one dependent instruction of a first instruction by a processor responsive to an invalid status of an ancestor load instruction associated with the first instruction. A processor includes an instruction pipeline having an execution unit to execute instructions, a load store unit for retrieving data from a memory hierarchy, and a scheduler unit. The scheduler unit selects for execution in the execution unit a first load instruction having at least one dependent instruction linked to the first load instruction for data forwarding from the load store unit and suppresses execution of a second dependent instruction of the first dependent instruction responsive to an invalid status of the first load instruction.

17 Claims, 3 Drawing Sheets

DEPENDENT INSTRUCTION SUPPRESSION

BACKGROUND

1. Field of the Disclosure

The present disclosure generally relates to processors and, more particularly, to suppression of dependent instructions.

2. Description of the Related Art

Processors typically enhance processing efficiency by employing out-of-order execution, whereby instructions are executed in an order different from the program order of the instructions. In replay processors, in addition to out-of-order execution, instructions may be executed speculatively based on an assumption that the memory subsystem will provide requested data prior to the execution of the instruction. For example, a speculative load instruction may be executed based on the assumption that a previous store instruction will have been completed so that the data for the load instruction is available. A scheduler in the processor schedules and tracks speculatively executed instructions. Data from a speculative load instruction may be used by other instructions to perform other operations. The load instruction may be referred to herein as the "parent instruction" and the other instructions that use data from the speculative load instruction are referred to herein as "dependent instructions" or alternatively, "child instructions." Multiple levels of dependency may be present in that a particular parent instruction may have a dependent child instruction, and the child instruction may have its own dependent instruction(s).

A speculatively executed load instruction may generate invalid results due to a load failure, for example, because the memory subsystem is not ready to provide the data for the load. In response to identifying the invalid status of a speculatively executed instruction, the scheduler may replay or reissue the instruction with the invalid status and any of its dependents that had also been speculatively executed so that they can be executed with the correct operand data. Because the scheduler speculatively issues instructions that span multiple levels of dependency, the number of instructions subject to replay may be significant, and thus negatively impact performance and power consumption at the processor.

BRIEF DESCRIPTION OF THE DRAWINGS

The present disclosure may be better understood, and its numerous features and advantages made apparent, to those skilled in the art by referencing the accompanying drawings.

The use of the same reference symbols in different drawings indicates similar or identical items.

DETAILED DESCRIPTION

FIGS. 1-5 illustrate example techniques for suppressing the execution of dependent instructions of a load instruction in situations where an ancestor of the load instruction returns an invalid status during the time frame that the load instruction is being executed. Data for an operand of a given instruction can be supplied by a load/store unit for data retrieved from the memory hierarchy, from a physical register file in the execution unit, or from an output of an execution unit. A data bypass network conventionally is used by a processor to reduce latency for dependents of load instructions so that data may be forwarded directly from the source of the data (e.g., the load/store unit or the execution unit) for use by the dependent instruction, rather than waiting for data to be loaded into a register file and then provided to the dependent instruction. To implement data forwarding, the processor links the first load instruction that retrieves the data to a dependent instruction that uses the data. In some cases, the dependent instruction is a second load instruction that uses data retrieved by the first load instruction.

A processor may attempt to improve performance by speculatively executing instructions. For example, when the first load instruction is selected for execution, a tag associated with the load instruction is broadcast to the scheduler to awake instructions that are dependent on the load instruction, including the second load instruction. In a speculative processor, dependent instructions of load instructions are typically made eligible for execution prior to identifying whether the status of the load instruction is valid or invalid. Thus, the second load instruction (i.e., a dependent of the first load instruction) is made eligible for execution when the first load instruction is scheduled for execution, and the dependents of the second load instruction are typically made eligible for execution after scheduling of the second load instruction. If the first load instruction returns an invalid status, the second load instruction and any of its dependents that were speculatively executed would also necessarily have invalid status. As described in greater detail herein, the linking between the first and second load instructions used for data forwarding may be used to suppress one or more dependent instructions of the second load instruction in response to receiving an invalid status indication for the first load instruction. The dependents of the second load instruction may be suppressed by preventing them from being awoken by the scheduler responsive to scheduling the second load instruction for execution. This suppression thereby prevents the execution of the dependents, thereby conserving processor resources and power that would have been otherwise expended executing instructions that necessarily have invalid status due to the invalid status of the ancestor load instruction.

Figure 1:
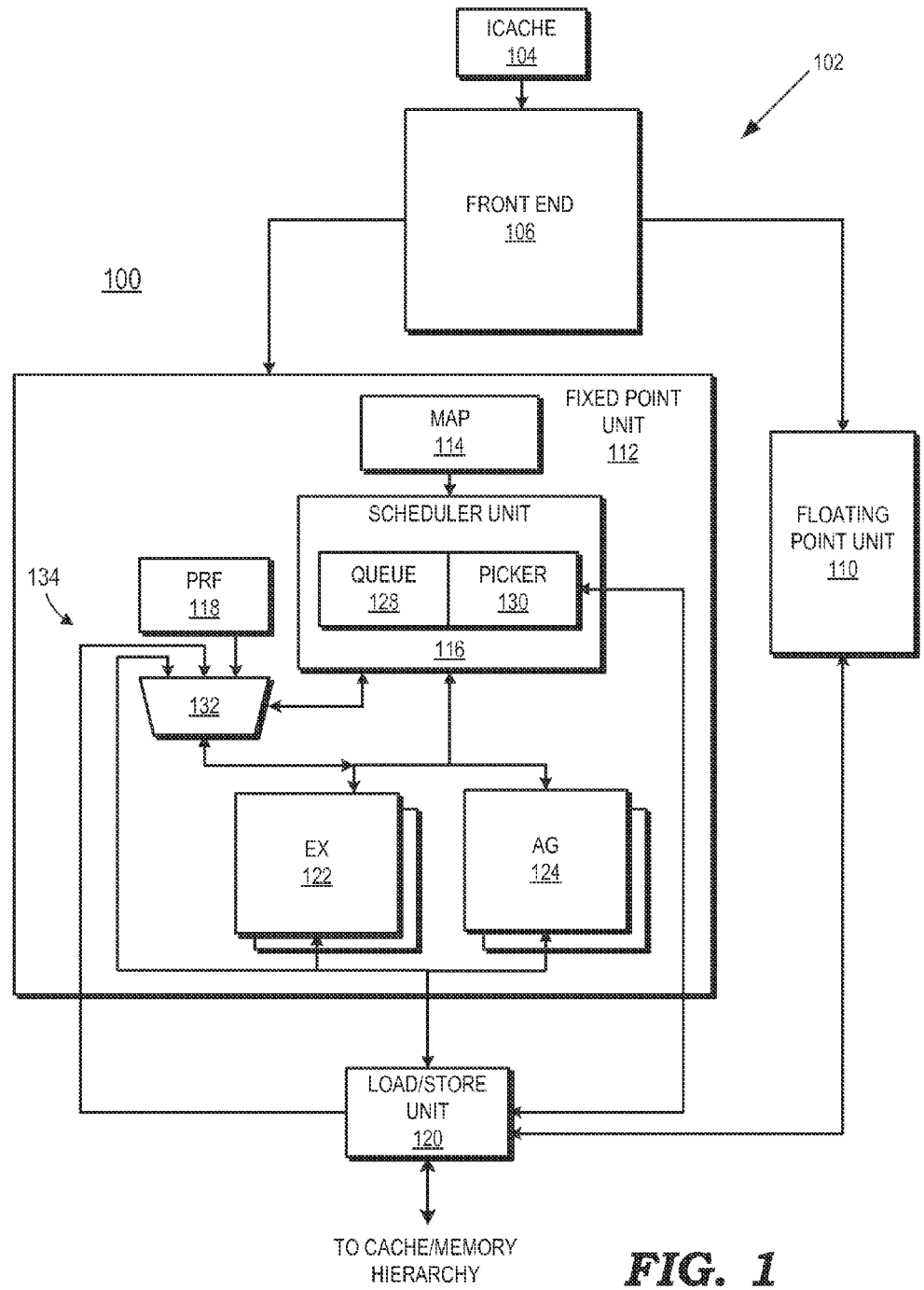
FIG. 1 is a block diagram of a processor core in accordance with some embodiments.

FIG. 1 illustrates a processor core 100 of a processor having an execution pipeline 102 that implements dependent instruction suppression in accordance with some embodiments. The illustrated processor core 100 can include, for example, a central processing unit (CPU) core based on an x86 instruction set architecture (ISA), an ARM ISA, and the like. The processor can implement a plurality of such processor cores, and the processor can be implemented in any of a variety of electronic devices, such as a notebook computer, desktop computer, tablet computer, server, computing-enabled cellular phone, personal digital assistant (PDA), set-top box, game console, and the like.

In the depicted example, the execution pipeline 102 includes an instruction cache 104, a front end 106, one or more floating point units 110, and one or more fixed point units 112 (also commonly referred to as "integer execution units"). The processor core 100 also includes a load/store unit (LSU) 120 connected to a memory hierarchy, including one or more levels of cache (e.g., L1 cache, L2, cache, etc.), a system memory, such as system random access memory (RAM), and one or more mass storage devices, such as a solid-state drive (SSD) or an optical drive.

The instruction cache 104 stores instruction data which is fetched by the front end 106 in response to demand fetch operations (e.g., a fetch to request the next instruction in the instruction stream identified by the program counter) or in response to speculative prefetch operations. The front end 106 decodes the fetched instructions into one or more operations that are to be performed, or executed, by either the floating point unit 110 or the fixed point unit 112. In a microcoded processor architecture, this decoding can include translating the instruction into one or more micro-operations (uOps), whereby each uOp is identified by a corresponding opcode value and can be separately executed within the fixed point unit 112. Those operations involving floating point calculations are dispatched to the floating point unit 110 for execution, whereas operations involving fixed point calculations are dispatched to the fixed point unit 112.

The fixed point unit 112 includes a map unit 114, a scheduler unit 116, a physical register file (PRF) 118, and one or more execution (EX) units 122 (e.g., arithmetic logic units (ALU)) and one or more address generation (AG) units 124. In general, both the EX units 122 and the AG units 124 are considered to be execution units in that they execute instructions. Operations requiring retrieval or storage of data, such as load or store operations, are dispatched by the picker 130 to an AG unit 124, which calculates the memory address associated with the operation and directs the LSU 120 to perform the corresponding memory access using the generated address. Operations requiring numerical manipulations or other arithmetic calculations are dispatched to the appropriate EX unit 122 for execution.

The PRF 118 stores a set of physical registers, each of which is associated with a different physical register name (PRN). As consistent with industry usage, the term "PRN," as used herein can refer to the name of the physical register, and can refer to the physical register that has that name. Thus, for example, "storing data at a PRN" indicates that the data is stored at the physical register identified by the PRN.

The scheduler unit 116 includes a scheduler queue 128 and a picker 130. In an operation of the fixed point unit 112, the map unit 114 receives operations from the front end 106 (usually in the form of operation codes, or opcodes). These dispatched operations typically also include, or reference, operands used in the performance of the represented operation, such as a memory address at which operand data is stored, an architected register at which operand data is stored, one or more constant values (also called "immediate values"), and the like. The map unit 114 and the scheduler unit 116 control the selective distribution of operations among the EX units 122 and AG units 124, whereby operations to be performed are queued in the scheduler queue 128 and then picked therefrom by the picker 130 for issue to a corresponding EX unit or AG unit. Typically, each queue entry of the scheduler queue 128 includes a field to store the operation payload or operation identifier (e.g., the opcode for the operation), fields for the addresses or other identifiers of physical registers that contain the source operand(s) for the operation, fields to store any immediate or displacement values to be used with the operation, and a destination field that identifies the physical register in which the result of the execution of the corresponding operation is to be stored. For example, a load instruction includes address information indicating the target of the load instruction and an architected register operand indicating the PRN that receives the data from the target address.

Prior to storing an operation in the scheduler queue 128, the map unit 114 performs register renaming whereby external operand names (i.e., architected register names (ARNs)) are translated into internal operand names (i.e., PRNs). This renaming process includes the map unit 114 evaluating a subset of operations including the operation to be queued to identify some dependencies between sources and destinations associated with the operations, and then mapping architected registers to physical registers so as to avoid false dependencies and facilitate parallel execution of independent operations as using register renaming techniques known in the art.

The picker 130 monitors the scheduler queue 128 to identify operations ready for execution, and upon picking an available operation and verifying its operands are ready and available, dispatches the operation to an EX unit 122 or an AG unit 124. The picker 130 waits to pick operations for a dependent instruction until it receives an indication that the operations for the parent instruction(s) have been implemented or scheduled. In response to receiving the indication, the picker 130 sets a status of the dependent instruction from an unavailable status (referred to as a "sleep" status) to an available status (referred to as an "awake" status) to indicate that it can be picked for execution, and picks the dependent instruction according to the availability of the requisite EX unit 122 or AG unit 124.

In the context of the example described above, the second load instruction may be "awoken" (i.e., switched from sleep status to awake status) responsive to the picker 130 scheduling the first load instruction for execution. The picker 130 may speculatively schedule the second load instruction for execution prior to determining the valid or invalid status of the first load instruction. As described in greater detail herein, the dependents of the second load instruction may be suppressed by the scheduler unit 116 after an indication is received that the first load instruction had an invalid status by blocking the dependency tag broadcast for the second load instruction to awake its dependents. This blocking of the dependency tag broadcast suppresses the dependent instructions and prevents their speculative execution. In some embodiments, an invalid status indication for the first load instruction may result from a data cache miss, a store-to-load forwarding error due to the store data not being ready or replay safe, store-to-load forwarding retries, or a miss in a translation lookaside buffer (not shown), which stores information for virtual to physical address translations.

The address generation operations performed by the AG units 124 and the arithmetic operations performed by the EX units 122 typically utilize operand data. The operands referenced by an instruction being executed typically refer to data by PRN, which was converted from a reference to an ARN by the map unit 114, as described above. Load operations performed by the AG unit 124/LSU 120 and arithmetic operations performed by the EX unit 122 result in data that is to be stored in the PRF 118 for the PRN identified as the destination of the load operation or arithmetic operation. Accordingly, each of the EX unit 122 and the LSU 120, upon generating a result (either by completing an arithmetic operation for the EX unit 122 or by loading data from the memory hierarchy for the LSU 120), initiates a PRF write to the destination PRN of the load instruction.

The scheduler unit 116 controls a multiplexer 132 to implement a data bypass network 134 to select a data source provided to an execution unit 122, 124 for implementing an instruction to avoid waiting for a PRF write. The scheduler unit 116 implements data forwarding by comparing the destination PRN of the parent instruction against the source PRN of the dependent instruction to identify a match. The scheduler unit 116 configures the multiplexer 132 to select the PRF 118 as its data source for data that has been previously stored in a particular PRN. If the PRN of the data source for an operand matches the destination PRN of an operation being completed by the EX unit 122, the scheduler unit 116 configures the multiplexer 132 to select the output of the EX unit 122 as its data source. For data being retrieved by the LSU 120 from the memory hierarchy that has a destination PRN matching the PRN referenced by an operand of the executing instruction, the scheduler unit 116 configures the multiplexer 132 to select the LSU 120 as its data source after receiving an indication from the LSU 120 that the data is available. Selecting the EX unit 122 or the LSU 120 as the data source reduces latency by obviating the need to first store the results in the PRF 118.

Depending on microarchitectural implementation, there may be a limited number of cycles over which a parent instruction can bypass a result to a dependent instruction. This window of time also indicates the number of cycles that a dependent instruction can wait after being made eligible for execution by the picker 130 until it is picked before it may no longer use the data bypass network 134. For example, if a two-cycle bypass is implemented, the data bypass network 134 is used if the dependent instruction is picked for execution within two cycles of the time it is made eligible for execution by a broadcasting parent instruction.

Figure 2:
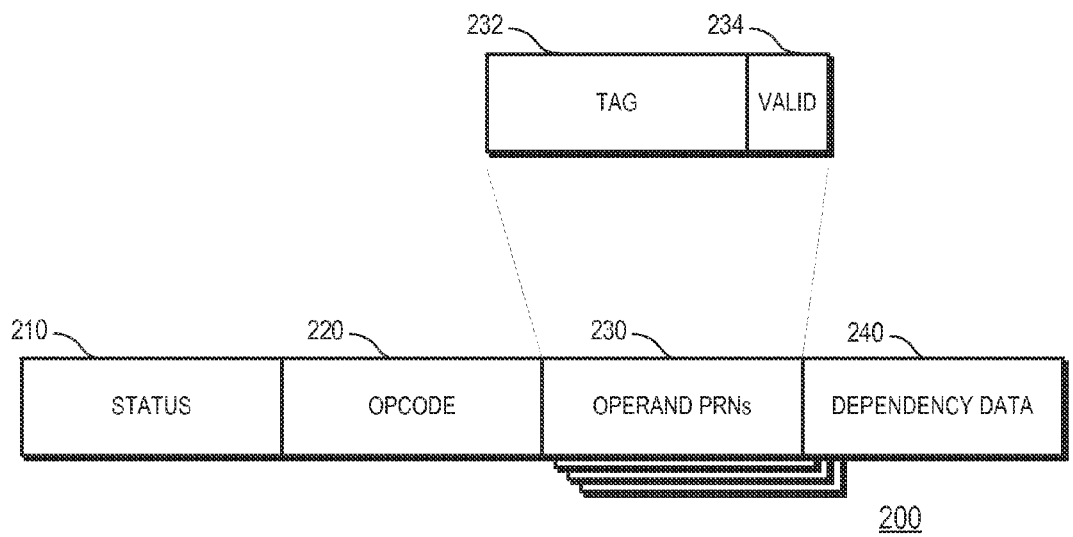
FIG. 2 is a block diagram of an entry of a scheduler queue of the processor core of FIG. 1 in accordance with some embodiments.

FIG. 2 illustrates a scheduler queue entry 200 in accordance with some embodiments. The scheduler queue entry includes a status field 210, an opcode field 220, and operand physical register (PRN) fields 230. The status field 210 provides a status indicator of the instruction in the scheduler queue 128. The values of the status field 210 are used by the picker 130 to determine the eligibility of the instruction for scheduling. For example, a status of AWAKE indicates that the instruction is available to be scheduled for execution. A status of SLEEP indicates that the instruction is a dependent of a different instruction that has not yet progressed to a state of completion that triggers the awakening of its dependents. A status of INVALID indicates that an error has occurred with the instruction, and that it may need to be replayed. The opcode field 220 indicates the operation specified by the instruction.

In general, when a load instruction is selected by the picker 130, dependents of the load instruction are awoken by setting their status field 210 value to AWAKE. In some embodiments, the destination PRN for the data of the load instruction that is picked by the picker 130 is matched to the source PRN of the other entries in the scheduler queue 128 to identify matches and awake the matching instructions that use the data from the first load instruction.

The operand PRN fields 230 include tags 232 for the PRNs specified by the operands of the instruction and valid bits 234. The number of operand PRN fields 230 may vary depending on the particular architecture of the processor core 100. For purposes of the following illustrations, the number of operand PRN fields 230 is assumed to be four. In the context of the data bypass network 134, the tag 232 indicates that the source for the data corresponding to the PRN is the PRF 118, the EX unit 122, or the LSU 120. The valid bit 234 for each tag 232 is set when the data associated with the source is ready. For example, if the operand data is already resident in the PRF 118, the valid bit 234 may be set. For operand data coming from the EX unit 122, the valid bit 234 may be set when the instruction is being executed, so the result can be read when the data is available. For operand data coming from the LSU 120, the valid bit 234 may be set when the data is being received by the LSU 120.

Figure 3:
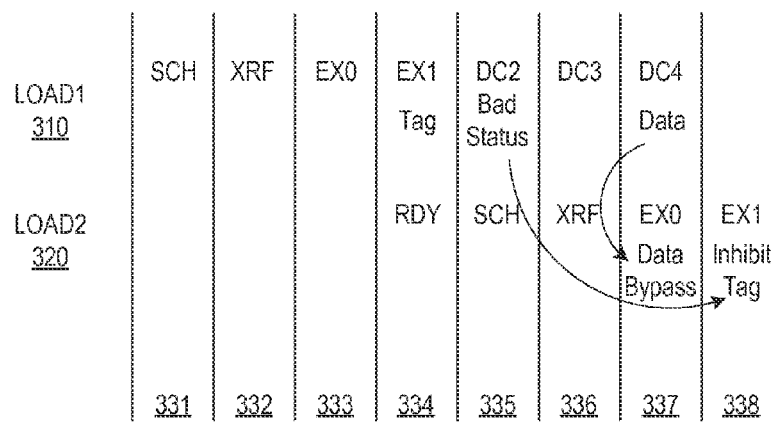
FIG. 3 is a pipeline diagram illustrating the suppression of dependent instructions responsive to identifying an invalid status of an ancestor load instruction in accordance with some embodiments.

FIG. 3 is a pipeline diagram 300 illustrating the suppression of dependent instructions responsive to identifying an invalid status of an ancestor load instruction in accordance with some embodiments. An ancestor load instruction refers to a load instruction preceding the dependent instructions in the dependency chain. The pipeline progressions for a first load instruction 310 and a second load instruction 320, which is a dependent instruction of the first load instruction 310, are shown. The first and second load instructions 310, 320 may be executed in different AG units 124.

Event 331 represents the schedule stage (SCH) for LOAD1, during which the first load instruction is picked for execution by the picker 130. Event 332 represents the register file stage (XRF), where operands are read. Register operands are read from the PRF 118 and immediate/displacement operands are read out of a payload structure holding data known at dispatch time. Event 333 represents the first execution stage (EX0) for the LOAD1 instruction where the load address is calculated and sent to the LSU 120 for data retrieval.

Event 334 represents the second execution stage (EX1) during which a tag associated with the load instruction (e.g., its destination PRN identifier) is broadcast to awake dependents of the LOAD1 instruction that have matching source PRNs, such as the LOAD2 instruction. The tag broadcast awakes the LOAD2 instruction in event 334 designated by its ready stage (RDY). During event 335, an invalid status indication is received for the LOAD1 instruction during its data cache stage (DC2) stage. For example, an invalid status may be the result of a data cache miss, a store-to-load forwarding error, a store-to-load forwarding retry, or a miss in the TLB. The LOAD 2 instruction is also selected for execution by the picker 130 in event 335, as evidenced by its SCH stage.

During event 337, the valid bit from the LSU 120 is asserted indicating that the data has returned for the LOAD1 instruction in the DC4 stage and is present in the LSU 120 and eligible for bypass. The data bypass network 134 identifies the dependency relationship between the LOAD1 and LOAD2 instructions based on their respective destination and source PRNs and the scheduler unit 116 initiates a data bypass. In the context of the scheduler entry 200 of FIG. 2 for the LOAD2 instruction, the tag 232 references the data in the LSU 120 and the valid bit 234 is set based on the indication received from the LSU 120 that the data is present, thereby enabling the data bypass network 134 to pass the data to the LOAD2 instruction via the multiplexer 132.

Although the data has returned in the LSU 120, the data is invalid due to a mis-speculation, as indicated by the invalid status result received in event 335. In event 337, the linking between the LOAD1 and LOAD2 instructions by the data bypass network 134 in combination with the invalid status received for the LOAD1 instruction in event 335 enables the scheduler unit 116 to inhibit the destination PRN tag broadcast for the LOAD2 instruction that would have occurred in event 338 if the invalid status had not been received. Because the dependents of the LOAD2 instruction are not awoken, processing resources and power are not wasted on their speculative execution when they necessarily would have had an invalid status because of the invalid status of the LOAD1 instruction.

The present example illustrates dependent first and second load instructions. Typically, load instructions exhibit greater latency as compared to arithmetic operations, so there is a time interval during which the status of an ancestor load can be determined and used to suppress dependents of a subsequent dependent load instruction. The dependent instruction suppression techniques may be applied to a non-load dependent instruction if sufficient latency is associated with the dependent instruction to allow the status of the ancestor load to be received and used to suppress its broadcast tag.

Figure 4:
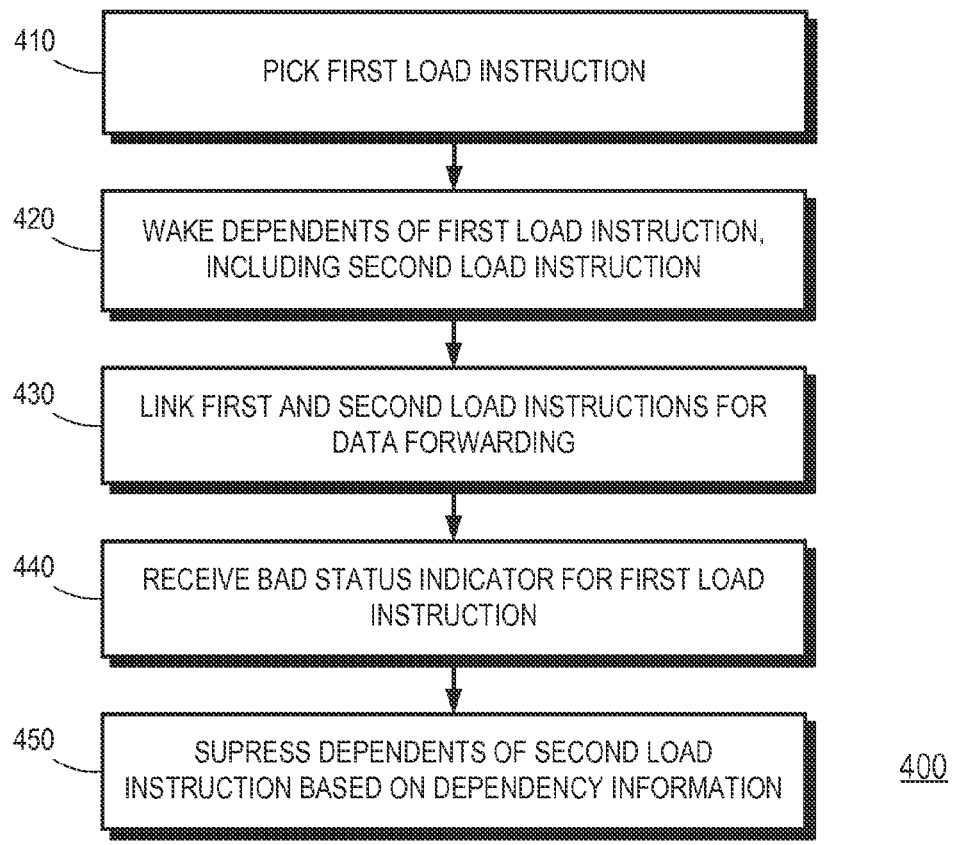
FIG. 4 is a flow diagram of a method for suppressing dependent instructions in accordance with some embodiments.

FIG. 4 is a flow diagram of a method 400 for suppressing dependent instructions in accordance with some embodiments. In method block 410, a first load instruction is picked for execution by the picker 130. In method block 420, the dependents of the first load instruction are awoken by setting their status fields 210 to AWAKE. The dependents of the first load instruction include a second load instruction. The PRN associated with the first load instruction may be used to awake dependent instructions referencing the same PRN. In method block 430, the first and second load instructions are linked by the scheduler unit 116 for data forwarding. As described above, the operand PRN fields 230 may be used to link the first and second instructions, where the destination PRN of the first load instruction matches a source PRN of the second load instruction.

In method block 440, an invalid status condition is registered for the first load instruction. The invalid status corresponds to a load failure, so the data for the first load instruction slated for forwarding to the second load instruction is invalid. In method block 450, dependents of the second load instruction are suppressed responsive to the invalid status indicator for the first load instruction. The dependents of the second load instruction may be suppressed by inhibiting the broadcast of a tag associated with the second load instruction that would have awoken its dependents.

By suppressing dependent instructions of a load instruction responsive to the invalid status of its ancestor load instruction, the expenditure of processor resources on instructions that will need to be replayed with the failed ancestor load instruction is avoided. The processor resources may be used to execute other instructions. Suppressing dependent instructions in this manner increases processor performance and reduces power consumption.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the processing system described above. Further, in some embodiments, serial data interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage NAS)).

Figure 5:
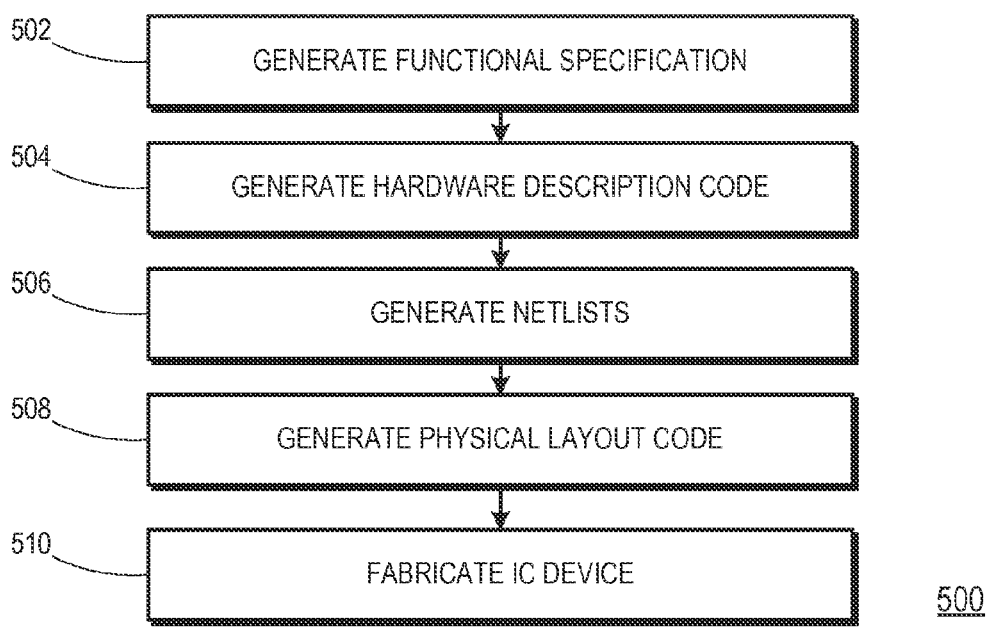
FIG. 5 is a flow diagram illustrating a method for designing and fabricating an integrated circuit device implementing at least a portion of a component of a processor in accordance with some embodiments.

FIG. 5 is a flow diagram illustrating an example method 500 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 502 a functional specification for the IC device is generated. The functional specification (often referred to as a micro architecture specification (MAS)) may be represented by any of a variety of programming languages or modeling languages, including C, C++, SystemC, Simulink, or MATLAB.

At block 504, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 506 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 508, one or more EDA tools use the netlists produced at block 506 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 510, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

As disclosed herein, in some embodiments a method includes suppressing execution of at least one dependent instruction of a first instruction by a processor responsive to an invalid status of an ancestor load instruction associated with the first instruction.

As disclosed herein, in some embodiments a method includes scheduling a first load instruction for execution by a processor, marking a first dependent instruction of the first load instruction as eligible for execution, and responsive to an indication of an invalid status of the first load instruction, suppressing execution of a second dependent instruction of the first dependent instruction by the processor.

As disclosed herein, in some embodiments a processor includes an instruction pipeline including an execution unit to execute instructions, a load store unit for retrieving data from a memory hierarchy, and a scheduler unit. The scheduler unit selects for execution in the execution unit a first load instruction having at least a first dependent instruction linked to the first load instruction for data forwarding from the load store unit and suppresses execution of a second dependent instruction of the first dependent instruction responsive to an invalid status of the first load instruction.

As disclosed herein, in some embodiments a non-transitory computer readable medium stores code to adapt at least one computer system to perform a portion of a process to fabricate at least part of a processor. The processor includes an instruction pipeline including an execution unit to execute instructions, a load store unit for retrieving data from a memory hierarchy, and a scheduler unit. The scheduler unit selects for execution in the execution unit a first load instruction having at least one dependent instruction linked to the first load instruction for data forwarding from the load store unit and suppresses execution of a second dependent instruction of the first dependent instruction responsive to an invalid status of the first load instruction.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   marking a first instruction as eligible for execution by a processor responsive to scheduling an ancestor load instruction associated with the first instruction for execution and responsive to the ancestor load instruction having a destination register name matching a source register name of the first instruction; and
   suppressing execution of at least one dependent instruction of the first instruction by the processor responsive to an invalid status of the ancestor load instruction associated with the first instruction.

2. The method of claim 1, further comprising linking the ancestor load instruction to the first instruction for data forwarding responsive to the ancestor load instruction having a destination register name matching a source register name of the first instruction.

3. The method of claim 2, wherein linking the ancestor load instruction to the first instruction comprises:
   issuing the ancestor load instruction to a load store unit for retrieving data associated with the destination register name; and
   generating a scheduler entry for the first instruction, the scheduler entry including an operand register field associated with the source register name, wherein the operand register field indicates the load store unit as a source of data for an operand of the first instruction specifying the source register name.

4. The method of claim 1, wherein suppressing execution of the at least one dependent instruction further comprises suppressing a broadcast of a tag for the first instruction used by a scheduler for marking dependents of the first instruction as eligible for execution.

5. The method of claim 4, wherein the tag comprises a destination register of the first instruction.

6. The method of claim 1, wherein the first instruction comprises a load instruction.

7. A method comprising:
scheduling a first load instruction for execution by a processor;
marking a first dependent instruction of the first load instruction as eligible for execution responsive to the first load instruction having a destination register name matching a source register name of the first dependent instruction; and
responsive to an indication of an invalid status of the first load instruction, suppressing execution of a second dependent instruction of the first dependent instruction by the processor.

8. The method of claim 7, further comprising linking the first load instruction to the first dependent instruction for data forwarding responsive to the first load instruction having a destination register name matching a source register name of the first load instruction.

9. The method of claim 8, wherein linking the first load instruction to the first dependent instruction comprises:
issuing the first load instruction to a load store unit for retrieving data associated with the destination register name; and
generating a scheduler entry for the first dependent instruction, the scheduler entry including an operation register field associated with the source register name, wherein the operation register field indicates the load store unit as a source of data for an operand of the first dependent instruction specifying the source register name.

10. The method of claim 7, wherein suppressing execution of the second dependent instruction further comprises suppressing a broadcast of a tag for the first load instruction used by a scheduler in the processor for marking dependents of the first dependent instruction as eligible for execution by the processor.

11. The method of claim 10, wherein the tag comprises a destination register of the first dependent instruction.

12. The method of claim 7, wherein the first dependent instruction comprises a load instruction.

13. A processor comprising:
an instruction pipeline, comprising:
an execution unit to execute instructions;
a load store unit for retrieving data from a memory hierarchy; and
a scheduler unit to select for execution in the execution unit a first load instruction having at least a first dependent instruction linked to the first load instruction for data forwarding from the load store unit, to mark the first dependent instruction as eligible for execution responsive to selecting the first load instruction for execution and responsive to the first load instruction having a destination register name matching a source register name of the first dependent instruction, and to suppress execution of a second dependent instruction of the first dependent instruction responsive to an invalid status of the first load instruction.

14. The processor of claim 13, wherein the scheduler unit is to mark the first dependent instruction eligible for execution by the execution unit responsive to selecting the first load instruction for execution.

15. The processor of claim 13, wherein the scheduler unit is to link the first load instruction to the first dependent instruction for data forwarding responsive to the first load instruction having a destination register name matching a source register name of the first dependent instruction.

16. The processor of claim 15, wherein the execution unit is to issue the first load instruction to the load store unit for retrieving data associated with the destination register name, and the scheduler unit is to generate a scheduler entry for the first dependent instruction, the scheduler entry including an operation register field associated with the source register name, wherein the operation register field indicates the load store unit as a source of data for an operand of the first dependent instruction specifying the source register name.

17. The processor of claim 13, wherein the scheduler unit is to suppress a broadcast of a tag for the first dependent instruction to prevent marking the second dependent instruction eligible for execution.

* * * * *